US012749928B2

(12) United States Patent
Van Wageningen et al.

(10) Patent No.: US 12,749,928 B2
(45) Date of Patent: Sep. 29, 2026

(54) CONTROLLING POWER IN A WIRELESS POWER TRANSFER SYSTEM

(71) Applicant: KONINKLIJKE PHILIPS N.V., Eindhoven (NL)

(72) Inventors: Andries Van Wageningen, Wijlre (NL); Antonius Adraan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 264 days.

(21) Appl. No.: 18/539,569

(22) Filed: Dec. 14, 2023

(65) Prior Publication Data

US 2024/0113569 A1 Apr. 4, 2024

Related U.S. Application Data

(63) Continuation of application No. 17/515,926, filed on Nov. 1, 2021, now Pat. No. 11,901,745, which is a (Continued)

(30) Foreign Application Priority Data

Jan. 3, 2018 (EP) .................................... 18150150

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
CPC ............. H02J 50/80; H02J 50/10; H02J 50/12
See application file for complete search history.

(56) References Cited

U.S. PATENT DOCUMENTS 9,735,836 B2 * 8/2017 Van Wageningen ..... H04B 5/79
10,340,751 B2 * 7/2019 Jung ...................... H04B 5/263
(Continued)

FOREIGN PATENT DOCUMENTS

JP 2017060335 3/2017

OTHER PUBLICATIONS

QI Specification Wireless Power Consortium "The QI Wireless Power Transfer System Power Class 0 Specification" Feb. 2018.
(Continued)

*Primary Examiner* — Menatoallah Youssef
*Assistant Examiner* — Michael J Warmflash

(57) ABSTRACT

The power transmitter (101) providing power to a power receiver (105) comprises a communicator (309) communicating with the power receiver (105) and a negotiator (305) negotiating a guaranteed power level with the power receiver (105) prior to a power transfer phase. The guaranteed power level is a minimum power level guaranteed by the power transmitter (101) throughout the power transfer phase. During the power transfer phase, a determiner (307) dynamically determines an available power level based on the prevailing operating parameters. The available power level is one that can currently be provided but is not guaranteed. The power controller (309) is arranged to, during the power transfer phase, increase the power level above the guaranteed minimum level in response to power control messages, and to reduce the power level regardless of the power control messages in response to a detection that the power level exceeds the available power level.

37 Claims, 7 Drawing Sheets

Related U.S. Application Data continuation of application No. 16/958,858, filed as application No. PCT/EP2019/050033 on Jan. 2, 2019, now Pat. No. 11,190,059.

(56) References Cited

U.S. PATENT DOCUMENTS

| | | | | |
|---|---|---|---|---|
| 11,190,059 | B2 | 11/2021 | Van Wageningen | |
| 2013/0181539 | A1* | 7/2013 | Muratov | H02J 50/10 307/104 |
| 2015/0155918 | A1* | 6/2015 | Van Wageningen | H04B 5/79 307/104 |
| 2015/0165917 | A1* | 6/2015 | Robers | B60L 53/00 320/109 |
| 2015/0303995 | A1* | 10/2015 | Staring | H04B 5/79 307/104 |
| 2016/0087691 | A1* | 3/2016 | Van Wageningen | H02J 50/402 307/104 |
| 2016/0197571 | A1* | 7/2016 | Olson | H02J 50/00 318/16 |
| 2016/0372963 | A1* | 12/2016 | Sankar | H02J 50/10 |
| 2017/0018965 | A1* | 1/2017 | Lee | H02J 50/80 |
| 2017/0018977 | A1* | 1/2017 | Van Wageningen | H02J 50/80 |
| 2017/0047786 | A1* | 2/2017 | Park | H02J 50/402 |
| 2017/0279305 | A1* | 9/2017 | Staring | H02J 50/10 |
| 2018/0076672 | A1* | 3/2018 | Shichino | H02J 50/80 |
| 2019/0296591 | A1* | 9/2019 | Park | H02J 50/10 |
| 2019/0334388 | A1* | 10/2019 | Van Wageningen | H02J 4/25 |
| 2020/0144869 | A1* | 5/2020 | Van Wageningen | H02J 50/80 |
| 2020/0280220 | A1* | 9/2020 | Ettes | H02J 50/10 |
| 2020/0373789 | A1* | 11/2020 | Park | H02J 50/10 |
| 2020/0395793 | A1* | 12/2020 | Ettes | H02J 50/10 |
| 2021/0075271 | A1* | 3/2021 | Van Wageningen | H02J 50/80 |
| 2023/0107009 | A1* | 4/2023 | Van Wageningen | H02J 50/60 307/104 |
| 2023/0187981 | A1* | 6/2023 | Choi | H02J 50/402 307/104 |
| 2023/0208194 | A1* | 6/2023 | Lee | H02J 50/10 320/108 |
| 2023/0246483 | A1* | 8/2023 | Park | H04L 67/34 320/108 |
| 2023/0336035 | A1* | 10/2023 | Park | H02J 50/60 |

OTHER PUBLICATIONS

International Search Report and Written Opinion from PCT/EP2019/050033 mailed Mar. 7, 2019.

* cited by examiner

CONTROLLING POWER IN A WIRELESS POWER TRANSFER SYSTEM

CROSS-REFERENCE TO PRIOR APPLICATIONS

This application is a continuation of U.S. application Ser. No. 17/515,926, filed on Nov. 1, 2021 which is a continuation of U.S. Pat. No. 11,190,059, filed on Jun. 29, 2020 which is the U.S. National Phase application under 35 U.S.C. § 371 of International Application No. PCT/EP2019/050033, filed on Jan. 2, 2019, which claims the benefit of EP Patent Application No. EP 18150150.3, filed on Jan. 3, 2018. These applications are hereby incorporated by reference herein.

FIELD OF THE INVENTION

The invention relates to the control of power in a wireless power transfer system and in particular, but not exclusively, to controlling the power provided to a power receiver under varying operating conditions.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

A key parameter of a wireless power transfer system is the control of the power provided to the power receiver. This is a very challenging issue which is further exacerbated by the fact that the power levels may not only vary substantially during a given power transfer operation but may also vary by a huge amount between different power applications and different power receiver devices.

In order to control the power during a power transfer operation, systems such as Qi implement a power control loop where the power transmitter adjusts the power level of the generated power transfer signal in response to power control (error) messages received from the power receiver.

Furthermore, in order to ensure that the power transmitter and power receiver are compatible, and to avoid conflicts occurring during the power transfer operation, the Qi specification includes a negotiation phase in which the power transmitter and power receiver negotiate a power level that the power transmitter guarantees to make available. In Qi v1.2.1 and v1.2.2, the specification describes the negotiation of the guaranteed power.

The negotiation phase is performed during the initialization phase and ensures that the power transmitter can provide sufficient power to the power receiver, or that the power receiver is capable of adapting its operation to the available power level (e.g. a charger may adapt the charging current). Accordingly, before the power transfer starts, parameters are negotiated which restrict the operating points to values that are acceptable to both the power transmitter and the power receiver.

However, an issue with the described approach is that it may result in an unnecessarily conservative approach. Specifically, in many scenarios, the negotiated guaranteed power may be lower than the power that potentially could currently be provided. For example, the power transmitter must ensure that the power transmitter can provide the guaranteed power in all circumstances but in some situations, it may be possible to provide a higher power level due to operating conditions not being at worst case levels (e.g. the input power level may be higher than the minimum level, or a temperature of a component of the power transmitter may be lower than a worst case scenario).

A possible way to address this would be to vary the guaranteed power during the power transfer phase such that it may provide a closer reflection of the current operating conditions. However, such an approach will not be ideal in many scenarios. For example, it will tend to be a slow and complex approach that requires re-negotiation of the guaranteed power level. Such re-negotiation will not only be slow and cumbersome but also require additional communication between the power receiver and the power transmitter. Further, the approach may introduce some risks in some situations. For example, if the operating conditions suddenly change to the worst case values, the power transmitter can no longer provide the guaranteed power level expected by the power receiver. This may potentially in a worst case situation cause a malfunction.

Hence, an improved approach to power control in a wireless power transfer system would be advantageous and, in particular, an approach allowing increased flexibility, reduced cost, reduced complexity, improved power control, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention power transmitter for wirelessly providing power to a power receiver via an inductive power transfer signal; the power transmitter comprising: a communicator for communicating with the power receiver; a negotiator for negotiating a guaranteed power level with the power receiver prior to a power transfer phase, the guaranteed power level being a minimum power level guaranteed by the power transmitter throughout the power transfer phase; a determiner for during the power transfer phase dynamically determining a maximum acceptable available power level for the power transfer signal in response to an operating parameter of the power transmitter, the maximum acceptable available power level being a power level that can currently be provided by the power transmitter but which is not guaranteed for the power transfer phase; a power controller for controlling a power level of the power transfer signal during the power transfer phase in response to power control messages received from the power receiver; wherein the power controller is arranged to, during the power transfer phase, increase the power level above the guaranteed minimum level in response to the power control messages, and to reduce the power level regardless of the power control messages in response to a detection that the power level exceeds the maximum acceptable available power level.

The invention may provide improved power control and power operation in many embodiments. In particular, it may allow a more flexible power management in wireless power transfer systems, such as Qi systems.

In many embodiments, the approach may allow increased power transfer without requiring complex processes or communication. In many embodiments, a more flexible and efficient power control operation can be achieved. The approach may in many embodiments provide both the advantages of negotiation based power management and of one sided adaptive power management.

In many scenarios, the approach may allow higher power transfer to the power receiver when appropriate. For example, a power receiver for charging a battery may initiate a power transfer phase based on a negotiated minimum guaranteed power level and may accordingly adapt the provided charging current to the corresponding level. However, the system is not restricted to maintain this worst case charging current in all conditions but rather may support a varying and higher charging current being provided during the power transfer phase when the operating conditions allow it.

In many embodiments, the guaranteed power level may be a static power level that does not vary as a function of changing operating parameters during the power transfer phase. In contrast, in many embodiments, the maximum acceptable available power level may be dynamic power level that varies as a function of at least one changing operating parameter.

The guaranteed power level and the maximum acceptable available power levels may be referenced to the power transfer signal or e.g. to a level of an output power of the power receiver is arranged to communicate the maximum acceptable available power level to the power receiver.

This may provide improved performance in many embodiments and scenarios. It may in many systems allow the power receiver to remain in control of the power level of the power transfer signal, and specifically the power control loop may be used to adapt the actual power provided by the power transfer signal such that this follows restrictions caused by a dynamically varying available power level.

In accordance with an optional feature of the invention, the communicator is arranged to communicate a new value of the maximum acceptable available power level to the power receiver when the determiner determines a changed maximum acceptable available power level.

This may provide improved performance and allow the power receiver to dynamically adapt to changing conditions. It may specifically in many scenarios allow a dynamic optimization of the power transfer.

In accordance with an optional feature of the invention, the communicator is arranged to communicate the maximum acceptable available power level as a relative value with respect to a power level of the power transfer signal.

This may provide improved and/or facilitated operation in many embodiments. It may in particular facilitate the power transmitter determining and reporting a maximum acceptable available power level independently of the specific properties of the power receiver. Similarly, the power receiver may determine the maximum acceptable available power level to apply without it requiring any specific knowledge of the operation of the power transmitter, or of any properties of the power transmitter.

The approach may provide the advantage of the communicated maximum acceptable available power level being relative and dimensionless. The power transmitter may typically determine the relative maximum acceptable available power level based on any value that may restrict the power delivery, and it may more accurately reflect the actual situation since no translation is needed from a reference.

In accordance with an optional feature of the invention, the power controller is arranged to delay the step of reducing the power level regardless of the power control message until the power level of the power transfer signal has exceeded the maximum acceptable available power level for longer than a delay time interval.

The approach may allow improved performance, and in many embodiments a more reliable operation can in particular be achieved. The approach may effectively allow the power receiver to remain in control of the adaptation of the power transfer to the changing conditions and maximum acceptable available power level while at the same time allowing the power transmitter to provide a safety operation that may ensure that the maximum acceptable available power level will be adapted to even if the power receiver does not do so.

In some embodiments, the power controller may be arranged to delay reducing the power level regardless of the power control message until the power level of the power signal has exceeded the maximum acceptable available power level for longer than a delay time interval.

In accordance with an optional feature of the invention, the delay time interval is not less than 0.5 second and not more than 10 seconds.

This may provide a particularly advantageous operation in many embodiments and scenarios.

In accordance with an optional feature of the invention, the operating parameter is at least of: a temperature of a component of the power transmitter; an ambient temperature.

This may provide a particularly advantageous determination of a maximum acceptable available power level to reflect the operating conditions and their effect on the power that can currently be provided.

In accordance with an optional feature of the invention, the negotiator is arranged to negotiate the guaranteed power level based on properties of a reference power receiver.

This may provide facilitated and/or improved performance. The guaranteed power level may be determined based on reference/nominal properties of a power receiver rather than on the specific properties of the specific power receiver currently being supported. This may substantially assist the power transmitter in determining a suitable guaranteed power level and may provide or facilitate compatibility between the power receiver and the power transmitter without requiring them to exchange information of their specific properties.

In accordance with an optional feature of the invention, the guaranteed power level is independent of operating conditions during the power transfer.

This may provide an advantageous operation in many embodiments. Specifically, the guaranteed power level may not change when the operating parameters of the power transfer changes. The guaranteed power level may be determined based on a consideration of reference properties rather than on specific properties, and may be independent of a change in the value of such properties.

In accordance with an optional feature of the invention, the determiner is arranged to determine the maximum acceptable available power level without communicating with the power receiver.

This may provide advantageous operation in many embodiments. In particular, it may facilitate operation and reduce communication requirements.

In accordance with an optional feature of the invention, the negotiator is arranged to determine the guaranteed power to not exceed 70% of a maximum possible power level for the power transmitter.

This may provide advantageous operation in many embodiments. In many embodiments, the guaranteed power level may further be subject to a minimum value, such as e.g. a minimum value of 5 W or 10 W.

According to an aspect of the invention there is provided a power receiver for wirelessly receiving power from a power transmitter via an inductive power transfer signal; the power receiver comprising: a communicator for communicating with the power transmitter; a negotiator for negotiating a guaranteed power level with the power transmitter prior to a power transfer phase, the guaranteed power level being a minimum power level guaranteed by the power transmitter throughout the power transfer phase; a power controller for transmitting power control messages to the power transmitter to establish a power control loop; and wherein the power receiver is arranged to maintain a power transfer operation during the power transfer phase despite the power transfer signal level not changing in accordance with the power control messages if the power transfer signal level is above the guaranteed power level.

In accordance with an optional feature of the invention, the communicator is arranged to receive a maximum acceptable available power level from the power transmitter, the maximum acceptable available power level being a power level that can currently be provided by the power transmitter but which is not guaranteed for the power transfer phase; and the power controller is arranged to, during the power transfer phase, transmit power control messages requesting an increase in the power level above the guaranteed minimum level and to transmit power control messages requesting a decrease in the power level in response to a detection that the power level exceeds the maximum acceptable available power level.

According to an aspect of the invention there is provided a method of operation for a power transmitter wirelessly providing power to a power receiver via an inductive power transfer signal; the method comprising: communicating with the power receiver; negotiating a guaranteed power level with the power receiver prior to a power transfer phase, the guaranteed power level being a minimum power level guaranteed by the power transmitter throughout the power transfer phase; dynamically determining, during the power transfer phase, a maximum acceptable available power level for the power transfer signal in response to an operating parameter of the power transmitter, the maximum acceptable available power level being a power level that can currently be provided by the power transmitter but which is not guaranteed for the power transfer phase; controlling a power level of the power transfer signal during the power transfer phase in response to power control messages received from the power receiver; wherein controlling the power level comprises, during the power transfer phase, increasing the power level above the guaranteed minimum level in response to the power control messages, and reducing the power level regardless of the power control messages in response to a detection that the power level exceeds the maximum acceptable available power level.

According to an aspect of the invention there is provided a method of operation for a power receiver wirelessly receiving power from a power transmitter via an inductive power transfer signal; the method comprising: communicating with the power transmitter; negotiating a guaranteed power level with the power transmitter prior to a power transfer phase, the guaranteed power level being a minimum power level guaranteed by the power transmitter throughout the power transfer phase; transmitting power control messages to the power transmitter to establish a power control loop; and maintaining a power transfer operation during the power transfer phase despite the power transfer signal level not changing in accordance with the power control messages if the power transfer signal level is above the guaranteed power level.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
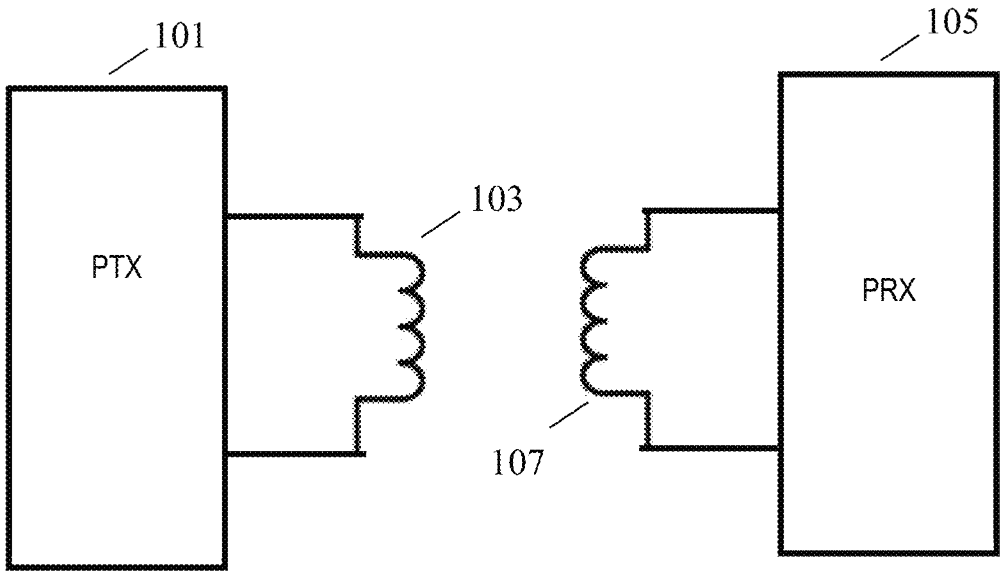
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the baseline power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

During initialization of a power transfer operation, the power transmitter and power receiver determine a number of operational parameters. This process involves establishing communication parameters, capabilities etc. Specifically, as part of the initialization, the power transmitter and power receiver perform a negotiation phase in which a number of operational parameters are determined based on a communication exchange between the power receiver and power transmitter. Specifically, the process involves the power receiver proposing operational parameters and the power transmitter accepting or rejecting the parameters.

A specific parameter that is determined during the negotiation phase is a guaranteed power level (referred to as Guaranteed Power in the Qi Specifications) which is a minimum power level that the power transmitter guarantees that it will be able to provide throughout the power transfer phase. Thus, in Qi, the power transfer initialization involves the power transmitter and power receiver establishing a guaranteed power level which is the minimum power level that the power transmitter can provide to the power receiver under all circumstances. The power receiver accordingly proceeds with the power transfer knowing that the guaranteed power level is the maximum power level that can be guaranteed, and thus the power transfer operation proceeds under this constraint.

Typically, the process involves the power receiver determining the maximum power level it is expected to require, and it requests the power transmitter to agree to this guaranteed power level. The power transmitter may then choose to agree to this power level in which case the power transfer proceeds accordingly. However, if the request is rejected by the power transmitter, the power receiver may proceed to transmit a new request for a lower level for the guaranteed power level. This approach may be repeated until the power transmitter agrees to a guaranteed power level and the power transfer may then proceed with this constraint. The power receiver will specifically during the power transmission be constrained below this power level and will typically adapt accordingly. For example, a charging current for a battery may be set to a level ensuring that the power extracted does not exceed the guaranteed power level.

However, a disadvantage of this approach is that it typically leads to unnecessarily low power levels. Indeed, the guaranteed power level is determined as a static power level that is guaranteed throughout the power transfer phase and for all possible operating conditions. As a consequence, the guaranteed power level is set on the basis of worst case considerations resulting in a situation where the power transmitter would typically be able to provide a higher power level for the current operating conditions. This may for example result in the power receiver charging a battery at a lower charging current than necessary.

A solution to this issue may be to allow the guaranteed power level to be re-negotiated dynamically during the power transfer phase. This may allow the guaranteed power level to be varied during the power transfer phase and thus may allow the power that the power receiver considers it allowable to extract to be increased when operating conditions allow it, thereby allowing e.g. a higher charge current to be provided when appropriate.

However, in the system of FIG. 1, an improved approach is used wherein multiple power levels are used simultaneously to synergistically provide a more advantageous power management approach.

Specifically, the system may allow a guaranteed power level to be determined prior to the power transfer phase by performing a negotiation between the power receiver and the power transmitter. In many embodiments, an approach corresponding to the power transfer initialization negotiation phase for Qi may be employed. Thus, prior to the power transfer phase a guaranteed power level is negotiated thereby ensuring that the power transmitter and the power receiver are compatible and can establish (guaranteed) operating parameters that are acceptable to both the power receiver and the power transmitter. Thus, the negotiation process establishes that the power transfer phase can go ahead and that this will lead to acceptable operation in all circumstances.

The guaranteed power level determined during the negotiation may be a static value that is guaranteed for the entire power transfer phase and under all expected (or even possible) operating conditions. Thus, the guaranteed power level reflects a power level that can be provided by the power transmitter within the entire operating range. It should be appreciated that in most embodiments, the entire operating range is determined with reference to the specific power transfer operation, i.e. it refers to the operating range that is expected or estimated for the subsequent power transfer rather than necessarily to all possible operating points for a wireless transfer system.

Furthermore, the guaranteed power level is typically determined based on a consideration of reference properties for the power transmitter, or the power receiver, or often for both. Thus, in many embodiments, the power transmitter may determine the guaranteed power level based on properties of a reference power receiver rather than based on the specific properties of the specific power receiver that is receiving the power transfer phase.

The reference power receiver is typically a standardized or nominal power receiver which has a set of operating parameters. For example, the reference receiver may be defined to have a specific reference parasitic power loss capability (e.g. power loss due to eddy currents in metal parts of the power receiver), a reference size of the power receiver coil, a reference internal power consumption etc.

This information may be used by, or indeed typically be built into, the power transmitter's approach for determining the guaranteed power level that it can support. For example, in many embodiments, the negotiation and the guaranteed power level may be with reference to the output power of the power receiver, and indeed in many embodiments with reference to the output power of a reference or nominal power receiver rather than the actual power receiver present. Therefore, the power receiver may transmit a request for the power transmitter to provide a given output power level to a load. The request may directly request a guaranteed power level corresponding to this output power level. The power transmitter may then proceed to evaluate whether it can guarantee that sufficient power can be provided by the power transfer signal to support this output power level. This determination may be based on considering properties at the power transmitter as well as the properties of the reference power receiver. Thus, the determination is based on an assumption that the power receiver corresponds to a reference power receiver. If the power transmitter determines that it can provide the requested guaranteed power level, it accepts the request and otherwise it rejects the request leading to the power receiver issuing a new request for a lower guaranteed power level (or abandoning the power transfer).

An advantage of using the reference power receiver approach is that it avoids the requirement for the specific properties of the power receiver to be communicated to the power transmitter thereby leading to a more efficient approach. The power transmitter can operate based on known information of the reference power receiver and the power receiver can locally adapt e.g. the request for the guaranteed power level to reflect differences between the properties of the power receiver and those of the reference power receiver.

Thus, in the approach, a guaranteed power level is first determined by negotiation where the guaranteed power level specifically corresponds to the amount of output power of an appropriate reference power receiver that the power transmitter ensures is available at any time during the power transfer phase. The guaranteed power level is in most embodiments a static power level that is guaranteed for the duration of the power transfer phase and for the full range of operating points. It is furthermore in many embodiments determined based on the properties of a reference power receiver rather than based on the properties of the specific power receiver actually involved.

Typically, the power transmitter is arranged to determine the guaranteed power level in consideration of a potential maximum power that could be provided. This potential power corresponds to the amount of output power for an appropriate reference power receiver that the power transmitter can make available during the power transfer phase under optimal conditions. This parameter is fixed by the design of the power transmitter and can be considered to be the maximum possible power level of the guaranteed power level in ideal conditions. The guaranteed power level may in practice be set to a substantially lower level in order to provide sufficient margin and to compensate for the specific operating conditions and power receiver properties.

The guaranteed power level provides guaranteed minimum operating conditions for the power receiver and ensures that an acceptable power transfer can be performed. Thus, it ensures robustness and reliability of the power transfer. However, it does not ensure optimization of the operation and in many scenarios the guaranteed power level will be lower than the power level that could potentially be provided by the power transmitter in the specific current situation.

In the system of FIG. 1, improved performance is achieved by introducing a further parameter in the power control management, and by allowing the power receiver to proceed to extract more power from the power transfer signal than the agreed and negotiated guaranteed power level. Thus, in contrast to an approach wherein the power transmitter and power receiver determine a power level that the transmitter can guarantee, and with the power receiver ensuring that it does not exceed this level, the current approach allows the power receiver to exceed the power level and to extract more power than has been agreed with the power transmitter.

In the approach, the power transmitter is arranged to dynamically determine a maximum acceptable available power level for the power transfer signal in response to an operating parameter of the power transmitter. The maximum acceptable available power level is determined as a power level that the power transmitter can provide under the current operating parameters. As the guaranteed power level reflects the minimum power that can be provided for worst case conditions, whereas the maximum acceptable available power level reflects the power level for the current operating conditions, the maximum acceptable available power level will (normally) not be lower than the guaranteed power level (assuming that the operating interval considered for the power transfer phase when determining the guaranteed power level remains valid. E.g. in an exceptional case where the coupling between the transmitter and receiver coils is very low, the maximum acceptable available power may be lower than the guaranteed power since the transmitter typically determines the guaranteed power on the assumption that the coupling is acceptable, and the receiver resembles a reference receiver). The maximum acceptable available power level may accordingly reflect a higher power level than agreed with, and guaranteed to, the power receiver. However, at the same time it may reflect a power level that the power transmitter will not exceed for the current operating conditions.

For brevity, the maximum acceptable available power level will in the following also be referred to simply as the available power level.

In the approach, the system seeks to allow the power receiver to increase the required/extracted power levels above that which has been agreed prior to the power transfer phase but to restrict this to not exceed the available power level. In some embodiments and scenarios, this second limit may be complied with by the power receiver, but in other embodiments and scenarios the second limit of the available power level may be controlled and imposed by the power transmitter (e.g. if the power receiver extracts too much power for too long).

Figure 2:
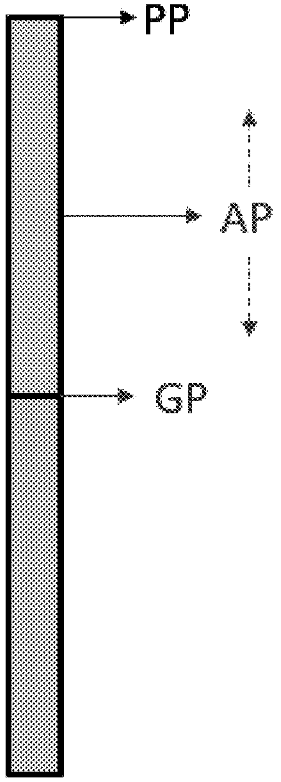
FIG. 2 illustrates an example of power levels in the power transfer system of FIG. 1.

In contrast to the approach of negotiating (whether dynamically or not) a power interval which is available to the power receiver, the approach of the system of FIG. 1 divides the available power range into three different intervals as indicated in FIG. 2 (where PP refers to Potential Power Level, AP refers to Available Power Level, and GP refers to Guaranteed Power Level). The system also defines a power interval (power levels below the guaranteed power level) in which the power transmitter is guaranteed to always provide power and which the power receiver can rely fully on. Also, the approach employs a power interval (power levels above the available power level) which is not supported by the power transmitter. However, in contrast to a re-negotiation approach, the system also employs a third dynamically determined power level interval (power levels above the guaranteed power level and below the available power level) for which the power transmitter may be supported currently but for which there is no guarantee that the power receiver can rely on.

Thus, following the negotiation, and at the start of the power transfer phase, the power receiver may have an agreed guaranteed power level that can always be relied on and which can form the basis of the operation. This ensures that the power receiver can provide a required operation and that an appropriate service can be performed.

During the operation, the power receiver may in addition attempt to increase the power level further than agreed, and if the power transmitter has determined an available power level that is higher than the requested power, the operation may indeed be supported and the service may be optimized.

For example, a power receiver may be part of a high current battery charger (e.g. for heavy duty car batteries). Prior to the power transfer phase, the power receiver and power transmitter may negotiate to determine a guaranteed power level. If it is only possible to determine a guaranteed power level that is not sufficient to allow an acceptable charge current for the battery, the power receiver may abandon the power transfer and charging process as acceptable operation is not feasible. The power receiver may e.g. in such a case indicate to the user that charging is not possible. However, as long as minimum conditions can be met, the power receiver may proceed with the charging operation as acceptable operation is guaranteed and will be guaranteed throughout the process. However, during the power transfer phase and charging operation, the power receiver may try to increase the charging current above the guaranteed amount, and if this can currently be supported by the power transmitter then a faster charging operation can be achieved.

The approach may thus combine the reliability and robustness of a guaranteed operation and support, yet at the same time optimize performance and adaptation to the instantaneous conditions. In addition, the approach may provide excellent backwards compatibility to existing wireless power transfer systems such as Qi.

Figure 3:
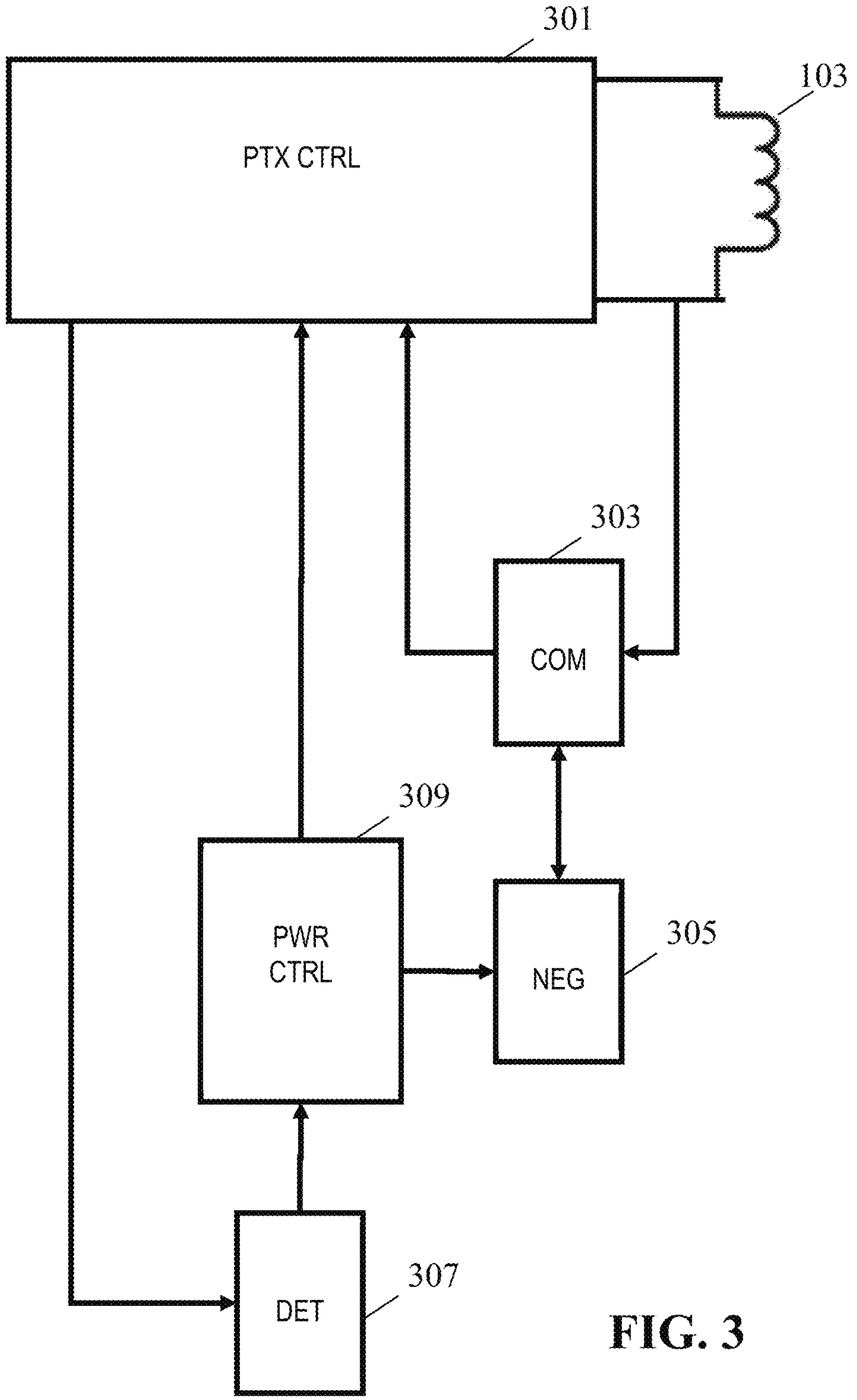
FIG. 3 illustrates an example of elements of a power transmitter in accordance with some embodiments of the invention.

FIG. 3 illustrates an example of some elements of the power transmitter 101 of FIG. 1.

The power transmitter 101 comprises a power transmitter controller 301 which is arranged to control the operation of the power transmitter 101 in accordance with the desired operating principles. Specifically, the power transmitter 101 may include many of the functionalities required to perform power control in accordance with the Qi Specifications.

The power transmitter controller 301 includes a driver which can generate a (power transfer) drive signal that is fed to the transmitter coil 103 which in return generates the electromagnetic power transfer signal thereby providing a power transfer to the power receiver 105. The power transfer signal is provided during power transfer time intervals of the power transfer phase.

The driver may typically comprise an output circuit in the form of an inverter, typically formed by driving a full or half bridge as will be well known to the skilled person.

The power transmitter controller 301 can specifically vary the power level of the drive signal, and accordingly the level of the generated power transfer signal (typically by changing a voltage, current or frequency of the drive signal).

In order to receive and transmit data and messages from/to the power receiver 105, the power transmitter 101 comprises a communicator 303 which is arranged to transmit and receive data and messages from the power receiver 105 (as will be appreciated by the skilled person, a data message may provide one or more bits of information). In the example, the power receiver 105 is arranged to load modulate the power transfer signal generated by the transmitter coil 103, and the communicator 303 is arranged to sense variations in the voltage and/or current of the transmitter coil 103 and to demodulate the load modulation based on these. The communicator 303 may further be arranged to control the power transmitter controller 301 to modulate the power transfer signal to transmit messages to the power receiver (e.g. using amplitude or frequency modulation)

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

The skilled person will be aware of the principles and approaches commonly used for data communication in wireless power transfer systems (as in e.g. Qi wireless power transfer systems), and therefore these will not be described in further detail.

The power transmitter 101 further comprises a negotiator 305 which is arranged to negotiate the guaranteed power level with the power receiver 105 prior to the power transfer phase.

In addition, the power transmitter 101 comprises a determiner 307 which during the power transfer phase dynamically determines the available power level for the power transfer signal.

The determiner 307 and the negotiator 305 are coupled to a power controller 309 which is arranged to control the power transmitter controller 301 to set the power level of the power transfer signal appropriately. During the power transfer phase, the power transmitter controller 301 controls the power level of the power transfer signal in response to the power control messages received from the power receiver 105. Thus, the power transmitter 101 and the power receiver 105 establish a power control loop during the power transfer phase.

During the power transfer phase, the power controller 309 is allowed to increase the power level above the guaranteed minimum level in response to the power control messages. Thus, if the power receiver 105 keeps transmitting power increase requests despite the power transfer signal already having a power level exceeding the guaranteed power level, the power controller 309 still increases the power level of the power transfer signal.

The power controller 309 is further arranged to reduce the power level if it is detected that the power level exceeds the available power level. This is done regardless of the power control messages received from the power receiver 105 (in many embodiments after a suitable delay in order to allow the power receiver time to adjust the operating point using the power control loop). Thus, even if the power receiver 105 transmits requests for increased power to be provided, the power controller 309 still proceeds to reduce the power level of the power transfer signal (typically until it drops to the available power level, although in some embodiments the power controller 309 may be arranged to reduce the power level further to provide a margin after an excess power situation has been detected).

The power transmitter of FIG. 3 thus supports the previously described approach and allows the power receiver 105 to extract power exceeding the agreed and guaranteed level, but still proceeds to limit the power to the available power level.

Figure 4:
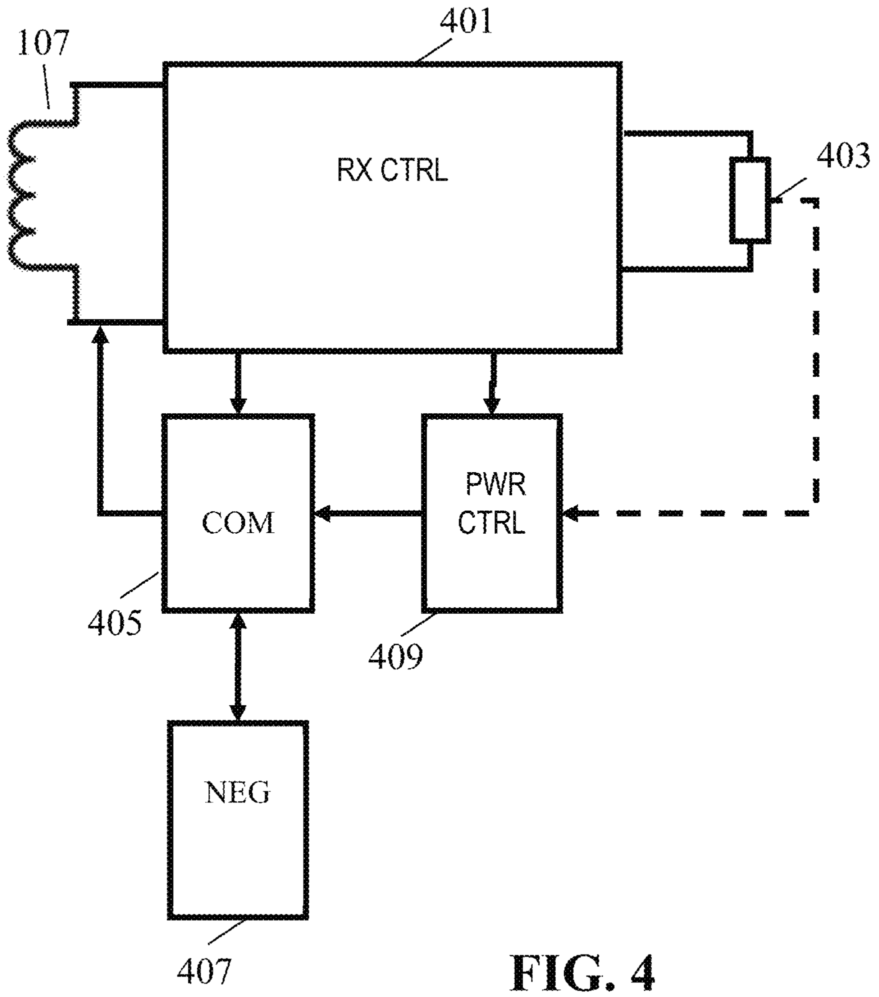
FIG. 4 illustrates an example of elements of a power receiver in accordance with some embodiments of the invention.

FIG. 4 illustrates an example of some elements of the power receiver 105 of FIG. 1.

The receiver coil 107 is coupled to a power receiver controller 401 which couples the receiver coil 107 to a load 403. The power receiver controller 401 includes a power control path which converts the power extracted by the receiver coil 107 into a suitable supply for the load 403. In addition, the power receiver controller 401 may include various power receiver controller functionality required to perform power transfer, and in particular functions required to perform power transfer in accordance with the Qi specifications.

In order to support communication between the power receiver 105 and the power transmitter 101 the power receiver 105 comprises a power receiver communicator 405. The power receiver communicator 405 comprises the required functionality to support communication with the communicator 303 of the power transmitter 101.

The power receiver 105 further comprises a receiver negotiator 407 which is arranged to negotiate the guaranteed power level with the power transmitter 101.

The power receiver 105 also comprises a receiver power controller 409 which is arranged to transmit power control messages to the power transmitter 101 thereby establishing the power control loop. In the example, the receiver power controller 409 measures the power dissipated in the load 403 and generates corresponding power request messages.

In the example, the receiver power controller 409 is arranged to transmit power control messages that request an increase in the power level above the guaranteed minimum level. Thus, even though the received power level may exceed the level that has been agreed between the power transmitter and the power receiver, the power receiver may still seek to increase the power beyond that.

The power receiver of FIG. 4 thus supports the previously described approach and specifically may extract power exceeding that has been agreed with and guaranteed by the power transmitter.

It will be appreciated that the power transmitter 101 may apply different approaches to determining the guaranteed power level in different embodiments and scenarios. In many embodiments, it may apply ensure that the guaranteed power level is not too close to the potential power in order to ensure that the guaranteed power level can always be provided. A particular advantage of the current approach is that a higher margin of the guaranteed power level with respect to the potential power may be set lower than if the approach is not used since the current approach allows support for operation above the guaranteed power level (i.e. a lower level of the guaranteed power level may be selected).

Indeed, in approaches in which operation is limited to power levels below the guaranteed power level, it is crucial that this limit is set as high as possible. This tends to result in a critical setting. However, in the current approach, a more conservative approach can be adopted, and the guaranteed power level may be kept below a lower level relative to the potential power. As the actual applied and supported power levels may exceed the guaranteed power level, the maximization of the guaranteed power level is much less critical.

In many embodiments, the power transmitter may be arranged to determine the guaranteed power to not exceed 70% of the maximum possible power level, i.e. of the potential power. Thus, in such embodiments, the negotiator 305 is arranged to reject any request for a guaranteed power level which exceeds 70% of the potential power but to accept any request below this value. In other embodiments, the margin may e.g. be 50%.

In many embodiments, the negotiator 305 may further impose a minimum level on the guaranteed power level, for example in many embodiments the guaranteed power level may be set to, say, 5 W as a minimum level.

Similarly, it will be appreciated that different approaches may be used by the determiner 307 to determine the available power level. In particular, different operating parameters may be considered in different embodiments.

In some embodiments, the detector 213 may determine the available power level as a function of a temperature of a component of the power transmitter or e.g. as a function of ambient temperature. For example, a case temperature or temperature of the output switch transistors of an inverter generating the drive signal may be measured. The measured temperature may then be converted into a maximum acceptable available power level. For example, during a design/manufacturing phase, a relationship between temperature and acceptable power levels may be determined. This function may e.g. be stored in a look-up-table in the power transmitter and then be used during the power transfer phase to convert the measured temperature into an available power level.

Alternatively or additionally, the available power level may be determined based on an input voltage or current that can be provided to the inverter. This may for example be useful if the power transmitter is battery driven and may e.g. allow for the available power level to be gradually decreased as the battery discharges.

As another example, the available power level may be determined (at least partially) based on an EMC condition. For example, the power transmitter may operate in an environment where the power signal interferes with other applications using the same frequency. In that case, the power transmitter may want to avoid that frequency or limit the amplitude of the power signal if the other application is active. The power transmitter may be arranged to vary the operating frequency to control the amplitude of the power signal, e.g. generate a large amplitude by using an operating frequency near resonance and a small amplitude by using an operating frequency relatively far away from resonance. If the operating frequency of the other appliance is near the resonant frequency of the power transmitter, the power transmitter may stay away from the resonance frequency if the other application is active.

Another example is to limit the current provided to the coil (103) to prevent an overvoltage situation at the power receiver. In case the coupling between the coils 103 and 107 is relatively weak, the power signal must be relative large to achieve sufficient power transfer. If in that situation, the coupling suddenly becomes stronger (e.g. the user adjusts the position of the power receiver), the induced Voltage at the power receiver may increase suddenly.

In many embodiments, the determination of the available power level is based only on operating conditions of the power transmitter 101. Thus, the value reflects the operating parameters of the power transmitter 101, and the available power level specifically reflects the power level that can be provided by the power transmitter 101 in these conditions.

Thus, in many embodiments, the detector 213 may determine the available power level without relying on any varying conditions at the power receiver. In many embodiments, the determiner 307 is arranged to determine the available power level without communicating with the power receiver. Thus, the input data that is used for determining the available power level may be determined by, and relate to, the power transmitter itself and none of input data may relate to varying conditions of the power receiver. Indeed, it is a substantial advantage of the approach that the varying available power level controlling the power that may be provided can be dynamically and unilaterally changed without requiring communication, and in particular negotiation, with the power receiver. Indeed, the approach may avoid the delay and complexity of e.g. negotiations or complex communications between the power transmitter and the power receiver.

The power levels may in different embodiments be related to different points in the power transfer path. For example, in some embodiments, the power levels (the guaranteed power level, available power level, and potential power level) may be power levels of the drive signal or of the power transfer signal. However, in many embodiments, the power levels may be related to the output power of the power receiver, i.e. to the power provided to the load 403 of the power receiver 105.

The power levels at different points in the path can be related/converted to each other by considering properties of the power receiver, power transmitter and the current conditions. For example, a reference power receiver and reference setup may be used by a power transmitter 101 to estimate the power level of the drive signal in order to provide a guaranteed power level or available power level corresponding to a specific power level at the receiver. It will be appreciated that reference to power levels may refer to the power levels at any suitable point in the power transfer path. For example, a reference to the power transmitter being able to provide a given available power level includes the power transmitter being able to generate the drive signal/power transfer signal to result in the given power level at the output of the power receiver if this is the reference used.

In many embodiments, the power transmitter 101 may be arranged to determine and apply the available power level locally without communicating it to the power receiver 105. In such embodiments, the power receiver 105 may simply be arranged to continue to request power increases when desired despite this being above the guaranteed power level (e.g. unless it exceeds the guaranteed power level by a certain margin). The power transmitter may be arranged to monitor the generated power level of the power transfer signal and compare it to the available power level. If the current power level exceeds the available power level, the power controller 309 proceeds to reduce the level of the power transfer signal regardless of whether the power receiver 105 requests increases or not. Thus, in this example, the power receiver 105 may operate and control the power control unless the power level increases above the available power level in which case the power transmitter 101 takes over and limits the power level.

Figure 5:
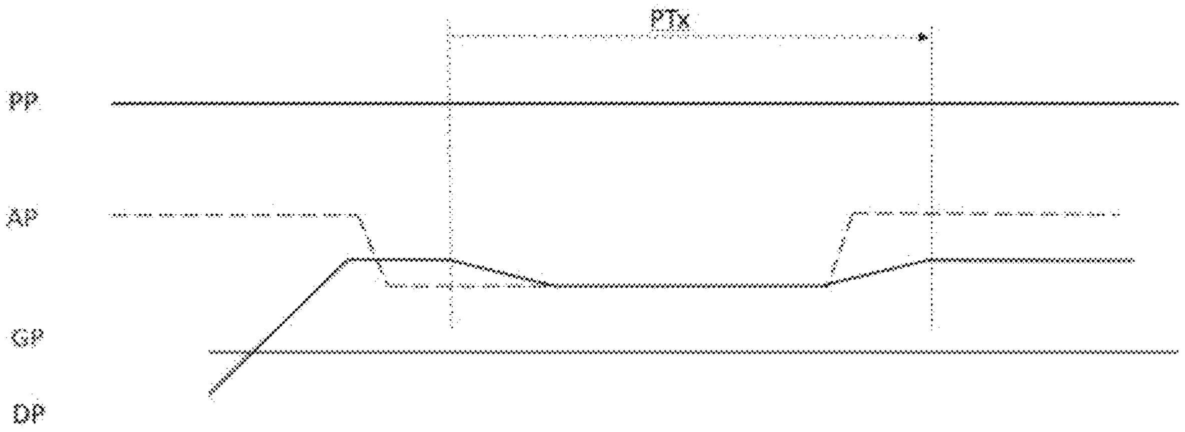
FIG. 5 illustrates an example of power levels in the power transfer system of FIG. 1.

An example of such an operation is provided in FIG. 5 which shows the potential power level PP, the guaranteed power level GP, and the available power level AP. In the example, the available power level varies such that it drops during part of the power transfer phase after which it returns to the original level. FIG. 5 further illustrates the delivered or actual power DP. Initially, the power receiver requests increased power until it reaches a static level which in the specific case is above the guaranteed power level but below the available power level. However, when the available power level drops, the delivered/actual power now exceeds the available power level. This is detected by the power transmitter 101 which proceeds to reduce the delivered power to not exceed the new lower available power level. This is done despite the power receiver 105 continuously requesting power increases in order to return to the desired higher power level.

At some point, the available power level returns to its original level. The power transmitter 101 now proceeds to react to the received power control messages and accordingly increases the power level in response to the received power increase requests until the scenario again stabilizes at the higher level (which is now below the available power level).

In many embodiments, the communicator 303 is arranged to communicate the available power level to the power receiver, and specifically the communicator 303 may communicate the new value of the available power level whenever this changes.

Thus, the power receiver may be provided with information of the available power level and accordingly it may be provided with information of both the minimum power level that is guaranteed for the whole power transfer, as well as the power level that can currently be provided but which is not guaranteed.

In such embodiments, the power receiver may retain control of the power management including allowing the power level to increase above the guaranteed power level while limiting it to not exceed the available power level.

Specifically, the receiver communicator 405 may receive information of the available power level from the power transmitter. The receiver power controller 409 may transmit power control messages requesting an increase in the power level above the guaranteed minimum level resulting in the delivered power exceeding the guaranteed power level. However, if it is detected that the power level exceeds the available power level, the receiver power controller 409 may no longer transmit power increase messages but instead it will proceed to request that the power is reduced (until it is below the available power level).

Figure 6:
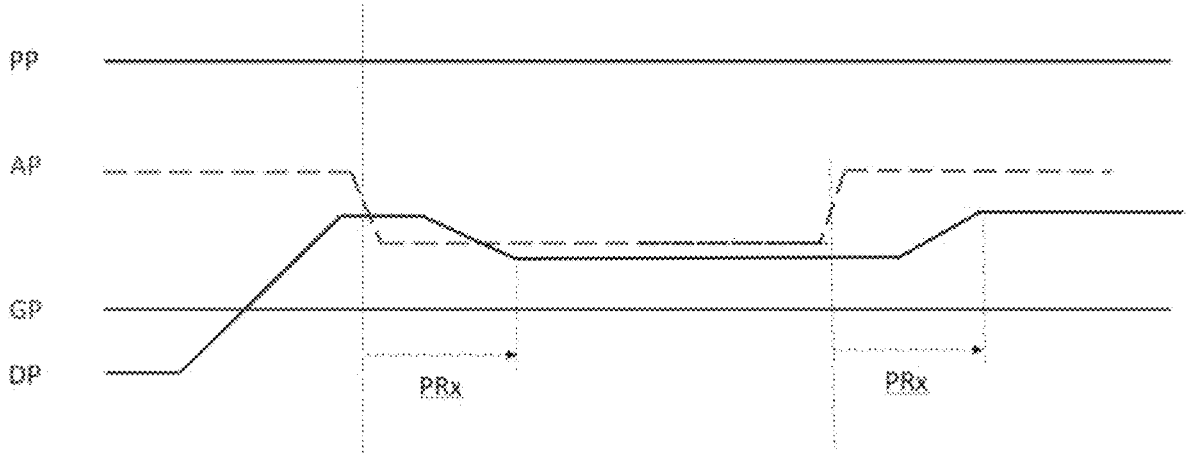
FIG. 6 illustrates an example of power levels in the power transfer system of FIG. 1.

An example of such an operation is provided in FIG. 6 which corresponds to the example of FIG. 5 except that the reduction of the delivered power level due to the reduced available power level is achieved by the power receiver requesting power reductions and maintaining the lower power level during the interval in which the available power level is reduced.

In such an example, the power transmitter 101 may accordingly transmit information of changes in the available power level and the power receiver 105 may be arranged to adapt its power requests and desired power level in response to the changes in the available power level.

In many embodiments, a combined approach may be used wherein the available power level is communicated to the power receiver which proceeds to control the power level accordingly. However, if the power transmitter 101 detects that the power receiver 105 does not adapt the power requests to result in a power level below the available power level, the power transmitter 101 takes over and reduces the power unilaterally.

For example, when the available power level is reduced, this may be communicated to the power receiver 105. The power receiver 105 is then expected to react and to reduce the power level to below the available power level. The system may allow this reduction to be gradual (indeed the reaction time of the power control loop prevents this change from being instantaneous (e.g. due to the slow message frequency)).

However, if the power receiver 105 does not react within a certain duration, the power transmitter 101 proceeds to take over and reduce the power level to below the available power level regardless of the received power control messages. Such an approach may accordingly allow the power receiver 105 to adapt and remain in control while allowing the power transmitter 101 to perform a safeguard operation to ensure that the power is reduced in all situations.

Thus, in such combined embodiments, the power controller 309 is arranged to reduce the power level regardless of the power control message if the power level of the power level signal exceeds the available power level for longer than a given delay time interval while operating in response to the received power control messages within the delay time interval.

The exact duration of the delay time interval will depend on the preferences and requirements of the individual embodiment. However, in many embodiments, particularly advantageous operation and trade-offs are typically found for a delay time interval between 1 and 10 seconds.

Figure 7:
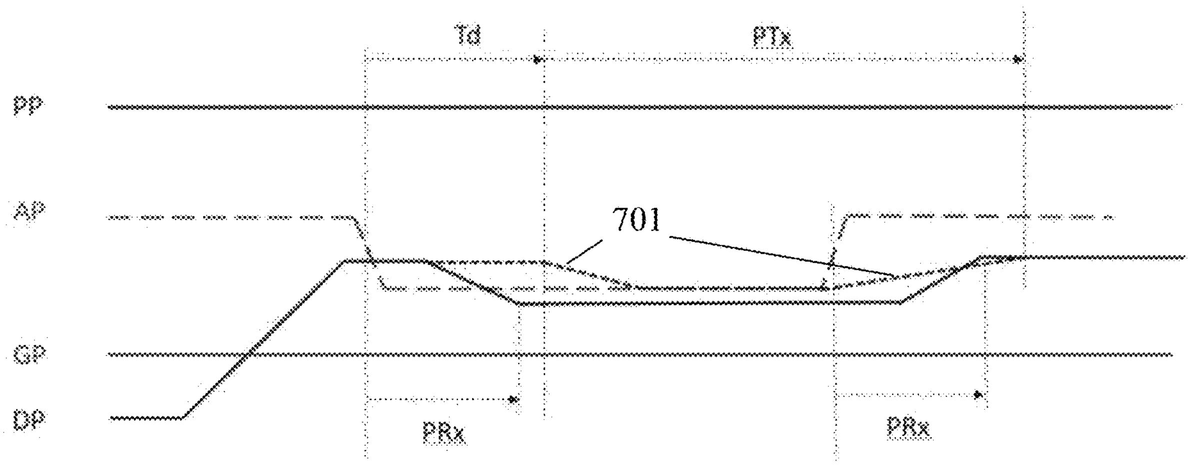
FIG. 7 illustrates an example of power levels in the power transfer system of FIG. 1.

An example of such an operation is provided in FIG. 7 which corresponds to the example of FIG. 6. However, in addition to the scenario wherein the power receiver reacts as described with reference to FIG. 6, FIG. 7 also shows an example of the power level 701 in the case where the power receiver does not react to the change in the power level. As illustrated, after a delay time interval Td, the power transmitter 101 takes over and itself reduces the delivered power level to below the new value of the available power level. Further, when this returns to the original level, the power level is allowed to increase accordingly.

In different embodiments, different approaches may be used for communicating the power levels and in particular the available power level. However, in many embodiments, the communicator 309 is arranged to communicate the available power level as a relative value with respect to the power level of the power transfer signal. Thus, rather than provide an absolute power level, such as a number of watts available, the system uses a relative value and thus indicates how the value may be changed relative to the reference.

For example, during the power transfer, the power transmitter may transmit an indication to the power receiver that the available power level is, say, 50% higher than the current power level. This may directly indicate to the power receiver that it is possible to increase the power extraction level by 50% and it may proceed using this information and value for the available power level. However, a particular advantage is that the power receiver does not need to convert or translate this value dependent on which part of the power path it is referenced with respect to. Indeed, the approach may allow the power transmitter to perform a local relative determination of how much the power level may be changed. Assuming a sufficiently linear relationship (e.g. with respect to losses), the power receiver may directly apply this relative change to its local value to determine the appropriate available power level.

This approach has the advantage of the communicated available power level being relative and dimensionless. The power transmitter can determine it based on any value that may restrict the power delivery and it can more accurately reflect the actual situation, because no translation is needed from a reference.

It will be appreciated that in some scenarios, the available power level may e.g. be provided as a relative value with respect to e.g. a previous available power level, or the guaranteed power level.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power receiver comprising:

a communicator circuit, wherein the communicator circuit is arranged to communicate with a power transmitter;

a negotiator circuit, wherein the negotiator circuit is arranged to negotiate a guaranteed power level with the power transmitter; and a power controller circuit, wherein the power controller circuit is arranged to transmit at least one power control message(s) to the power transmitter, wherein the power controller circuit is arranged to maintain a power transfer operation, wherein the power control message(s) include a request to increase a power transfer signal level above the guaranteed power level, wherein the power transmitter increases the power transfer signal level in response to the request only if the power transfer signal is less than a maximum acceptable available power level.

2. The power receiver of claim 1, wherein the negotiator circuit is arranged to negotiate the guaranteed power level with the power transmitter prior to a power transfer phase.

3. The power receiver of claim 1, wherein the guaranteed power level is a minimum power level.

4. The power receiver of claim 1, wherein the maximum acceptable available power level is not guaranteed.

5. The power receiver of claim 1, wherein the power transfer operation is maintained despite a power transfer signal level that is not changed in accordance with the power control messages.

6. The power receiver of claim 1, wherein the power transfer operation is maintained despite a power transfer signal level not changing in accordance with the power control messages if the power transfer signal level is above the guaranteed power level.

7. The power receiver of claim 1, wherein the communicator circuit is arranged to receive the maximum acceptable available power level from the power transmitter.

8. The power receiver of claim 1, wherein the maximum acceptable available power level is a power level that can currently be provided by the power transmitter but which is not guaranteed.

9. The power receiver of claim 1, wherein the power controller circuit is arranged to transmit at least one power control message(s) requesting a decrease in the power level in response to a detection that the power level exceeds the maximum acceptable available power level during the power transfer phase.

10. The power receiver of claim 1, wherein the communicator circuit is arranged to receive a new value of the maximum acceptable available power level.

11. The power receiver of claim 1, wherein the communicator circuit is arranged to receive a new value of the maximum acceptable available power level when a changed available power level is determined.

12. The power receiver of claim 10, wherein the maximum acceptable available is a relative value with respect to a power level of a power transfer signal.

13. The power receiver of claim 1, wherein the power level is not reduced until the power level of a power transfer signal has exceeded the maximum acceptable available power level for longer than a delay time interval.

14. The power receiver of claim 13, wherein the reducing of the power level occurs regardless of the at least one power control message(s).

15. The power receiver of claim 13, wherein the delay time interval is not less than 0.5 seconds and not more than 10 seconds.

16. The power receiver of claim 1, wherein the guaranteed power level is based on properties of a reference power receiver.

17. The power receiver of claim 1, wherein the guaranteed power level is independent of operating conditions during the power transfer.

18. The power receiver of claim 1, wherein maximum acceptable available power level is determined irrespective of communication with the power transmitter.

19. A method comprising:

communicating with a power transmitter;

negotiating a guaranteed power level with the power transmitter;

transmitting at least one power control message(s) to the power transmitter; and maintaining a power transfer operation during a power transfer phase, wherein the power control message(s) include a request to increase a power transfer signal level above the guaranteed power level, wherein the power transmitter increases the power transfer signal level in response to the request only if the power transfer signal is less than a maximum acceptable available power level.

20. The method of claim 19, further comprising negotiating the guaranteed power level with the power transmitter prior to a power transfer phase.

21. The method of claim 19, wherein the guaranteed power level is a minimum power level.

22. The method of claim 19, wherein the maximum acceptable available power level is not guaranteed.

23. The method of claim 19, further comprising maintaining the power transfer operation despite a power transfer signal level not changing in accordance with the power control messages.

24. The method of claim 19, further comprising maintaining the power transfer operation despite a power transfer signal level not changing in accordance with the power control messages if the power transfer signal level is above the guaranteed power level.

25. The method of claim 19, further comprising receiving the maximum acceptable available power level from the power transmitter.

26. The method of claim 19, wherein the maximum acceptable available power level is a power level that can currently be provided by the power transmitter but which is not guaranteed.

27. The method of claim 19, further comprising transmitting at least one power control message(s) requesting a decrease in the power level in response to a detection that the power level exceeds the maximum acceptable available power level during the power transfer phase.

28. The method of claim 19, further comprising receiving a new value of the maximum acceptable available power level.

29. The method of claim 19, further comprising receiving a new value of the maximum acceptable available power level when a changed available power level is determined.

30. The method of claim 28, wherein the maximum acceptable available is a relative value with respect to a power level of the power transfer signal.

31. The method of claim 19, wherein the power transmitter reduces the power level of the power transfer signal when the maximum acceptable available power level is exceeded for longer than a delay time interval.

32. The method of claim 31, wherein the reducing of the power level occurs regardless of the at least one power control message(s).

33. The method of claim 31, wherein the delay time interval is not less than 0.5 seconds and not more than 10 seconds.

34. The method of claim 19, wherein the guaranteed power level is based on properties of a reference power receiver.

35. The method of claim 19, wherein the guaranteed power level is independent of operating conditions during the power transfer operation.

36. The method of claim 19, wherein maximum acceptable available power level is determined irrespective of communication with the power transmitter.

37. A computer program stored on a non-transitory medium, wherein the computer program, when executed on a processor, performs the method as claimed in claim 19.

* * * * *